July 10, 1956 L. H. WINTER 2,754,379

RESET SWITCH

Filed Nov. 20, 1953

INVENTOR

LLOYD H. WINTER

BY

Walter L. Paul

ATTORNEYS

United States Patent Office 2,754,379

Patented July 10, 1956

2,754,379

RESET SWITCH

Lloyd H. Winter, Philadelphia, Pa., assignor, by mesne assignments, to the United States of America as represented by the Secretary of the Navy Application November 20, 1953, Serial No. 393,529

6 Claims. (Cl. 200—6)

This invention relates to a reset switch which operates to cause one wafer of a multi-wafer switch to home to the position of the other wafers of the switch.

A switch of this nature finds many applications, particularly where it is desired to maintain a reference until certain conditions are met. Thus, after all the wafers except a reference wafer of a switch have been rotated to establish new values, the reference wafer may be released to home to the position of the other wafers, and thus establish a new reference.

It is an object of this invention, therefore, to provide a multiwafer switch, one wafer of which is coupled to the drive shaft of the switch by means of a spring coupling, and which may be releasably locked in a reference position.

Another object of this invention is to provide a switching arrangement which causes one wafer of a multi-wafer switch to home to the position of the other wafers by simply pushing a release button.

Still another object of this invention is the provision of a multiwafer switch having a coaxial shaft, the outer shaft of which is spring coupled to one of the wafers, and the inner shaft of which is arranged to release the wafer.

Other objects and advantages of this invention will become aparent after a consideration of the following detailed description and the appended claims, taken in connection with the accompanying drawings in which:

Figure 1:
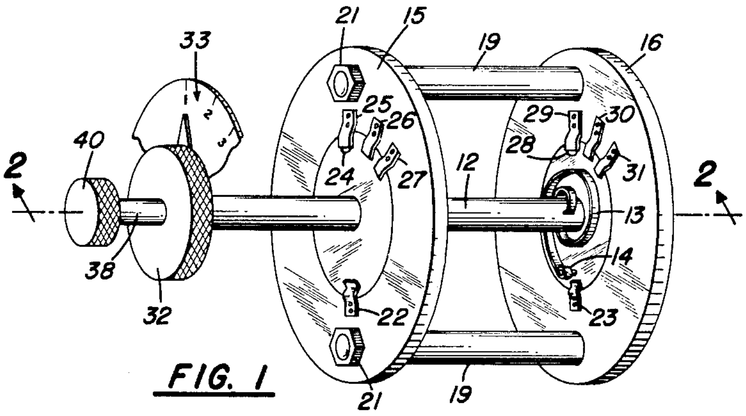
Fig. 1 is an isometric view showing a preferred embodiment of this invention.

Referring now to the drawings, there is shown a preferred form of a multiwafer reset switch mechanism of this invention which comprises a plurality of rotatably mounted conductive wafers 10 and 11. While only two wafers have been shown, it is understood that any number may be similarly mounted. The wafer 10 is spring coupled to the outer shaft 12 of an insulated coaxial shaft by means of a spiral torsion spring 13 which is secured at one end to the shaft 12, and at its other end to the wafer 10, by any suitable means such as the pin 14. Tthe wafer 11 is coupled directly to the outer shaft 12. The wafers 10 and 11 are rotatably supported, as shown, by a series of insulating discs 15 and 16, each of which is provided with wafer bearing surfaces 17 and 18, respectively. The discs 15 and 16 are maintained in fixed space relationship by means of a plurality of rods 19, only two of which have been shown for the sake of clarity, through which the bolts 20 have been passed and secured by means of the nuts 21.

A pair of contacts 22 and 23 are mounted on the discs 15 and 16, respectively, and are spring biased against the surface of the respective wafers 11 and 10, as shown. A contact 24 is mounted on the wafer 11 and is arranged to cooperate with the stationary contacts 25, 26 and 27, which are mounted on disc 15, while another contact 28 is mounted on the wafer 10 and is arranged to cooperate with the contacts 29, 30 and 31 which are mounted on the disc 16.

When the shaft 12 is rotated by means of the knob 32 to one of the positions shown on suitable indicator 33, the wafer 11, which is directly coupled to the shaft causes the contact 24 to move from contact 25 to contact 26 or 27. The wafer 10, however, will not move because of a latching mechanism employed in conjunction with the spiral spring coupling 13.

The latching mechanism consists of a flat spring 34 on which is mounted a projection 35. A rigid member 36, mounted on the wafer 10, is provided with recessed portions 37 which are arranged to cooperate with the projection 35. While the projection is engaged by a recessed portion, the position of the wafer 10 is locked. In order to release the wafer 10, an inner shaft 38 of the coaxial shaft has been provided.

Figure 2:
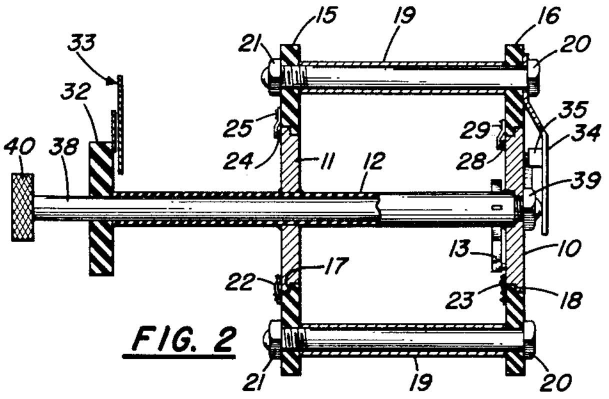
Fig. 2 is a cross sectional view taken through the line 2—2 of Fig. 1.
Figure 3:
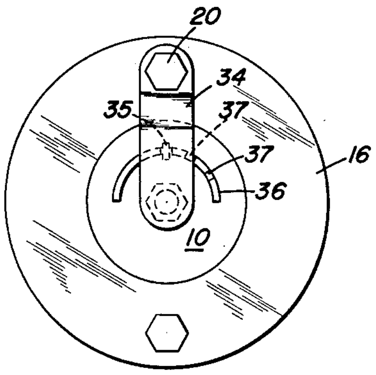
Fig. 3 is a view showing the spring locking mechanism.

The inner shaft 38 extends through the wafer 10 and is biased to the left (as seen in Fig. 2) by the flat spring 34. A nut or washer is secured to shaft, as shown, to provide a limit stop for the shaft. By pressing the shaft 38 to the right by means of the knob 40, the spring 39 is displaced and the projection 35 is disengaged from a recessed portion 37.

In operation, assume the switch is initially in the position shown, and assume it is desired to move the contact 24 of wafer 11 from the contact 25 to the contact 26, and at a predetermined later time, to move the contact 28 of wafer 10 from contact 29 to contact 30. The knob 32 is rotated clockwise until the indicator is at position 2 and the contact 24 will then engage the contact 26, while the wafer 10 and its contact are locked in their original position, since the recessed portion 37 is engaged by the projection 35. It is seen, however, that rotation of the shaft 12, without subsequent rotation of the wafer 10 creates a tension on the spring 15 which tends to rotate the wafer in a clockwise direction. By exerting pressure on the knob 40 against the pressure of the flat spring 34, the shaft 38 is depressed and the spring 34 is moved to the right and the projection 35 is thereby disengaged from the recessed portions 37. The wafer is thus unlocked and the energy stored in the spring 15 causes the wafer to rotate to a position corresponding to the position of wafer 11, and contact 28 will, therefore, engage contact 30. Upon release of the knob 40 and the shaft 38, the wafer 10 is relocked in its new reference position.

While the embodiment of the present invention as herein disclosed constitutes a preferred form, it is to be understood that other forms may be adopted, all coming within the spirit of this invention and within the scope of the claims which follow.

What is claimed is:

1. A multiwafer switch comprising: a plurality of contact carrying conductive wafers concentrically coupled to a rotatably mounted insulated shaft, the coupling between one wafer and said shaft consisting of a spring, and the coupling between the other of said wafers and said shaft being rigid; means for locking said one wafer in any of a plurality of selected positions; means for rotating said shaft whereby said other wafer is rotated to a selected position and said spiral spring is tensioned; and means for unlocking said one wafer whereby the tension on said spiral spring causes said one wafer to home to the rotated position of said other wafer.

2. A multiwafer switch comprising: a plurality of contact carrying wafers rigidly coupled to a rotatable tubular shaft; at least one contact carrying wafer directly spring-coupled to said shaft; means for locking said one wafer in a fixed position; means for rotating said shaft thereby rotating said plurality of contact carrying wafers, and tensioning the spring coupling of said one wafer; and means for unlocking said wafer whereby said one wafer is caused to rotate to the position of said plurality of wafers.

3. The invention as defined in claim 3 wherein said locking means comprises a flat spring member fixed at one end and having a projection on the other end thereof and normally biased to engage any one of a plurality of arcuately spaced recessed portions on said one wafer; and wherein said means for unlocking said wafer comprises a rod longitudinally moveable within said tubular shaft and arranged to displace said projections on said flat spring from said recessed portions.

4. The invention as defined in claim 1 wherein said locking means comprises a flat member fixed at one end and having a projection on the other end thereof normally biased to engage any one of a plurality of arcuately spaced recessed portions on said one wafer; wherein said insulated shaft is hollow; and wherein said unlocking means comprises a rod axially moveable within said insulated shaft and arranged to displace said projections on said flat spring from said recessed portions.

5. A switch comprising: a tubular shaft; a plurality of contact carrying members rigidly coupled to said shaft; at least one contact carrying member coupled to said shaft only by a spiral spring having one end thereof fastened to said shaft and the other end fastened to said one contact carrying member; means to lock said one contact carrying member in any of a plurality of positions;

means to rotate said shaft and said plurality of contact carrying members to any of a plurality of positions, thereby tensioning said spiral spring; and means to unlock said one contact carrying member, whereby said one contact carrying member is caused to rotate to the position of said plurality of contact carrying members.

6. The invention as defined in claim 8 wherein said locking means comprises a flat spring member fixed at one end and having a projection on the other end thereof normally biased to engage any one of a plurality of arcuately spaced recessed portions on said one contact carrying member; and wherein said means for unlocking said one contact carrying member comprises a rod longitudinally moveable within said tubular shaft and arranged to displace said projections on said flat spring from said recessed portions.

References Cited in the file of this patent

UNITED STATES PATENTS

| | | |
|---|---|---|
| 2,236,411 | Metcalf | Mar. 25, 1941 |
| 2,419,986 | Brown | May 6, 1947 |
| 2,668,261 | Hooker et al. | Feb. 2, 1954 |
| 2,680,166 | Dietrich | June 1, 1954 |

FOREIGN PATENTS

| | | |
|---|---|---|
| 781,489 | France | Feb. 25, 1935 |